United States Patent [19]

DeLong et al.

[11] 3,769,099
[45] Oct. 30, 1973

[54] BONDED ARC WELDING FLUX AND LIQUID BINDING AGENT THEREFOR

[76] Inventors: William T. DeLong; Edwin R. Szumachowski; Harold R. Heverly, all of c/o The McKay Company, 1005 Liberty Ave., Pittsburgh, Pa. 15222

[22] Filed: Oct. 13, 1970

[21] Appl. No.: 80,507

[52] U.S. Cl. .................. 148/26, 148/23, 219/73, 219/137, 219/146
[51] Int. Cl. ............................................. C23c 1/08
[58] Field of Search ................. 148/26, 23; 106/313

[56] References Cited
UNITED STATES PATENTS

| | | | |
|---|---|---|---|
| 1,946,958 | 2/1934 | Anastasiadis | 148/26 X |
| 3,501,354 | 3/1970 | DeLong | 148/23 |
| 3,580,748 | 5/1971 | DeLong | 148/26 |
| 3,320,100 | 5/1967 | Coless | 148/26 |

*Primary Examiner*—G. T. Ozaki
*Attorney*—Edward Hoopes

[57] ABSTRACT

Arc welding flux comprising finely divided flux material and a binding agent, the binding agent comprising finely divided water soluble or water dispersible material of the class consisting of fluorides, mixed fluoride, aluminates, hydroxides and carbonates of the alkali metals, at least one additional material of said class being present when said aluminate is present, said binding agent being present when said aluminate is present, said binding agent being present in quantity at least sufficient to provide adequate bond strength in the welding flux after the flux material, binding agent and water have been intensively mixed, dried and baked at from 650° F.

2 Claims, No Drawings

BONDED ARC WELDING FLUX AND LIQUID BINDING AGENT THEREFOR

This invention relates to bonded arc welding flux; more particularly, it relates to a non-silicate-bonded arc welding flux with rehydration resistance equal to or better than silicate bonded fluxes of the prior art and a liquid binding agent therefor.

Bonded fluxes appropriate to arc welding use are compounded from powdered flux materials such as minerals, oxides, salts and metals either for application as coatings to covered welding electrodes or for agglomeration and use along with the electrode in the submerged arc process.

For over 50 years the alkali metal silicates have been without serious competition as binding agents for the flux coatings applied to welding electrodes of the ferrous, nickel and nickel-base and copper-base types. More recently they have served as the chief binding agents for agglomerated submerged arc fluxes. Not without attractions, these silicate binders are convenient to use and store. They produce strong, durable electrode coatings capable of withstanding normal shipping and use without damage and control welding behavior due to the well defined and stable cup formed by the coating on the arc end of the electrode during welding. However, investigators in welding have long been interested in having some practical alternative to the alkali metal silicates to work with to study what new effects might be secured in slag behavior and metallurgical results without the contribution of silica which is always made by silicate binders and without some unacceptable contribution made by the alternative binder.

In U.S. Pat. No. 3,501,354 there is disclosed an alkali metal aluminate bonded welding flux comprising finely divided flux material and a binding agent comprising alkali metal aluminate, preferably sodium aluminate, in an amount of from 1 to 7.5 percent of the weight of the finely divided flux material, both calculated on a water-free basis. This flux has provided welding researchers with desirable new freedom in formulation, since it is not limited by the silicate binders used for fluxes in the past. However, even though such aluminate bonded welding flux has been a step in the right direction, newer areas of investigation, particularly those involving welding of high strength low alloy steel, have given researchers reason to look for still other binding agents for arc welding flux, with the general aim of being able to work with slag systems which are substantially free of both silica and the alumina contributed by aluminate binding agents. Further, the fluxes bonded with alkali metal aluminate alone are lower in rehydration resistance than the better silicate bonded fluxes of the prior art.

The value of reaching and holding low moisture content in welding fluxes is well known. In alkali metal aluminate bonded flux such as disclosed in the above mentioned U.S. Patent it was found that satisfactorily low moisture levels, in the range of those existing with the better silicate bonded fluxes, were obtainable with proper bake practices; however, rehydration rates of the aluminate bonded flux, measured by exposing the baked flux to an atmosphere of 88 percent relative humidity at room temperature for predetermined intervals of time and then calculating the percent increase in weight due to moisture pickup, were at best 3 to 4 times that of the best silicate bonded fluxes. Thus, although the aluminate bonded flux was useful from an experimental standpoint it would be at a commercial disadvantage when competing against silicate bonded fluxes.

The term flux as used herein refers both to fluxes applied to core wires by extrusion or dipping and to fluxes agglomerated into discrete particles for use in the submerged arc welding process.

We have now found that the use of certain novel binding agents in arc welding flux can provide both moisture level and rehydration resistance equal to or better than that of the better silicate bonded fluxes of the prior art. Our new approach also improves the rehydration resistance of aluminate bonded flux to a level matching or exceeding that of silicate bonded fluxes, and enables us to formulate fluxes free of both silica and alumina if desired.

In accordance with the invention, we provide arc welding flux comprising finely divided flux material and a binding agent, the binding agent comprising finely divided water soluble or water dispersible material of the class consisting of fluorides, mixed fluorides, aluminates, hydroxides and carbonates of the alkali metals, at least one additional material of said class being present when said aluminate is present, said binding agent being present in quantity at least sufficient to provide adequate bond strength in the welding flux after the flux material, binding agent and water have been intensively mixed, dried and baked at from 650° F to 950° F.

Other details, objects and advantages of the invention will become apparent as the following description of certain present preferred embodiments thereof proceeds.

Generally the binding agent should be present in an amount equal to at least 1.1 percent of the weight of the flux material after the flux has been baked and at least 5 percent of the weight of the binding agent should be selected from the group consisting of lithium fluoride and lithium hydroxide.

The term "mixed fluorides" includes, for example, silicofluorides such as $K_2SiF_6$.

In a preferred form the binding agent is present in an amount equal to from about 1.7 percent to about 10 percent of the weight of the flux material after the flux has been baked and at least 5 percent of the weight of the binding agent is selected from the group consisting of lithium fluoride and lithium hydroxide.

In one form of our novel flux which includes alkali metal aluminate as a binding agent, we provide arc welding flux comprising finely divided flux material and a binding agent, the binding agent consisting essentially of the following listed components present in amounts equal to the specified weight percentages of the flux material after the flux has been dried and baked:

| | |
|---|---|
| Alkali metal aluminate with a molecular ratio of alkali metal oxide to aluminum oxide between about 0.9 and 1.4 | 0.7 to 5% |
| Lithium fluoride | 0.4 to 3% |
| Sodium fluoride | 0 to 3% |
| Potassium fluoride | 0 to 3% |
| Alkali metal oxide from alkali metal hydroxide or carbonate | 0 to 3% |
| Total of above | 10% maximum |

In another form of our novel flux which is free of aluminate we provide arc welding flux comprising finely divided flux material and a binding agent, the binding agent consisting essentially of the following listed components in amounts equal to the specified weight percentages of the flux material when the flux has been dried and baked:

| | |
|---|---|
| Lithium fluoride | 0 to 2% |
| Sodium fluoride | 0 to 4% |
| Potassium fluoride | 0 to 3% |
| Lithium oxide from lithium hydroxide | 0 to 3% |
| Sodium oxide from sodium hydroxide | 0 to 3% |
| Sodium oxide from sodium carbonate | 0 to 2% |
| Potassium oxide from potassium hydroxide | 0 to 3% |
| Potassium oxide from potassium carbonate | 0 to 2% |
| Potassium silicofluoride | 0 to 1% |
| Total of above | 1.1 to 10% |

It will be noted that the amounts of binding agent contributed by the hydroxides and carbonates are listed herein in terms of the oxide when they are referred to the dried and baked flux. This is because our work has revealed that when the completed flux is baked at temperatures typically in the range of 650° F to 950° F the hydroxides lose their (OH) radical and the carbonates may lose $CO_2$; thus to provide uniformity in calculating the amounts of such binding agent components present in the finished welding flux we consider only the oxide portion thereof when dealing with the as-baked flux.

In preparing our novel fluxes we prefer to intensively mix the binding agent component or components, in finely divided form, with water to form a uniform aqueous mixture, mix said mixture with the dry finely divided flux material to form a wet mix of the desired consistency, extrude the wet mix on to a core wire of desired composition or agglomerate the wet mix into particles of the desired size for use as submerged arc welding flux, and finally dry and bake the wet flux at a temperature which, as above indicated, is in the range of 650° F to 950° F. However, the binding agent components may also be mixed in the dry state with the flux material and water added to and intensively mixed with the resultant dry mixture. The main requirement in either case is to arrive at a uniform and intimate mixture of the binding agent with the flux materials, because unless such a mixture is obtained the necessary bond and other properties of the finished flux will not be secured. Thus in the first case the binding agent and water may be mixed by means of a high speed blender, and in the second case the binding agent and flux material may preferably be mixed with water in a blender such, for example, as the P-K Twin-Cone Liquid-Solids Blender with Intensifier Bar manufactured by the Patterson-Kelly Company.

For use in the above-described preferred method of preparing our flux, we provide a liquid binding agent for bonded arc welding flux consisting essentially of a uniform aqueous mixture of the following listed finely divided ingredients in the specified weights per 100cc of water:

Alkali metal aluminate of the class consisting of sodium aluminate and potassium aluminate — 5 to 40 grams Lithium fluoride — 3 to 30 grams Material of the class consisting of sodium fluoride and potassium fluoride — 2 to 25 grams.

In a preferred form this binding agent consists essentially of a uniform aqueous mixture of the following listed finely divided ingredients in the specified weights per 100cc of water:

Sodium aluminate having a molecular ratio of sodium oxide to aluminum oxide of about 1.1 — 10 to 20 grams Lithium fluoride — 5 to 10 grams Sodium fluoride — 2 to 20 grams Potassium fluoride — 0 to 5 grams.

We further provide a somewhat similar liquid binding agent with the potassium fluoride replaced by potassium hydroxide, consisting essentially of a uniform aqueous mixture of the following listed finely divided ingredients in the specified weights per 100cc of water:

Sodium aluminate with a molecular ratio of sodium oxide to aluminum oxide of about 1.1 — 8 to 12 grams Lithium fluoride — 8 to 12 grams Sodium fluoride — 17 to 23 grams Potassium hydroxide — 8 to 12 grams.

We also provide an aluminate-free liquid binding agent for bonded arc welding flux consisting essentially of a uniform aqueous mixture of the following listed finely divided ingredients in the specified weights per 100cc of water:

Lithium hydroxide — 2 to 8 grams

Sodium fluoride — 15 to 25 grams

Sodium hydroxide — 2 to 8 grams

Potassium hydroxide — 2 to 8 grams.

The amount of any of our above described liquid binding agents necessary to provide the proper consistency for extrusion or agglomeration and sufficient bond strength when mixed with the flux materials will vary depending on the specific flux materials used and their particle size distribution, as is well known in the art. However, we have found that with flux material mixtures typical of those presently extant in the arc welding field the amount of liquid binding agent will be such as to provide an amount of binding agent in the baked flux equal to between about 1.1 percent and 10 percent of the weight of the flux material present.

We have found that to be effective in our novel flux the finely divided binding agent components must be water soluble or water dispersible — i.e. able to form at least a substantially colloidal suspension when intensively mixed with water. This requirement insures that the binding agent can be uniformly distributed throughout the flux material, whether added to the flux material as an aqueous mixture, which may be partly true solution and partly colloidal in character, or added in the finely divided dry form with subsequent water addition.

For optimum rehydration resistance in the finished flux, at least 5 percent of the weight of the binding agent should be lithium fluoride and/or lithium hydroxide. These lithium compounds have a much stronger effect on the rehydration resistance of the finished flux than do the other binding agent components.

One form of lithium fluoride which we have found satisfactory for use is a commercial grade material consisting of 99.5% minimum LiF and having a particle size distribution of 100% through U. S. 100 mesh and typically 90% through U. S. 325 mesh. This material as purchased is fluffy and tends to agglomerate into small spherical balls whenever it is mixed in the dry state, so that special care must be taken to insure that it is intimately and uniformly dispersed throughout the flux material when using it as a binding agent component.

One form of lithium hydroxide which we have found satisfactory is a commercial grade of lithium hydroxide monohydrate, typically 57% LiOH, in the form of crystals sized to approximately 20×100 U. S. mesh. This material can be readily dispersed in water.

With respect to the other binding agent components which we have found useful in the preferred method of preparing our flux, the following are brief descriptions thereof:

Sodium aluminate — Commercial low-priced white granular sodium aluminate trihydrate, water soluble, containing about 40% $Al_2O_3$, 31% $Na_2O$, 23% water and minor impurities. The $Na_2O$ to $Al_2O_3$ molecular ratio of this aluminate is about 1.1 and it readily forms a uniform liquid when mixed with water.

Sodium fluoride — Technical grade, fine powder, 99% min NaF.

Potassium fluoride — Commercial grade, fine flake, 95% min KF.

Sodium hydroxide — Technical grade, fine flake, 98% min NaOH.

Potassium hydroxide — Technical grade, fine flake, 90% min KOH.

Lithium carbonate — Technical grade, fine powder, 97% min $Li_2CO_3$.

Sodium carbonate — Technical grade, fine powder, 99% min $Na_2CO_3$.

Potassium carbonate — Technical grade, powder, 99% min $K_2CO_3$.

Potassium silicofluoride — Commercial grade, powder, 99% typical $K_2SiF_6$.

One liquid binding agent which we have found useful in the preparation of welding flux for covered electrode use consists of, per 100cc of water: sodium aluminate 15 grams, lithium fluoride 8 grams, sodium fluoride 3 grams, sodium chromate 0.3 grams. This combination is mixed in a high speed electric blender for a few minutes until a uniform liquid is obtained, after which it is added to and mixed with the flux materials of the electrode coating formulation to form a paste satisfactory for extrusion onto the core wire. As shown in this example, we may add a rust inhibitor such as sodium chromate to the liquid mixture to minimize corrosive attack on the processing equipment or metal powders in the flux mixture; we may also add some organic material such as sodium carboxymethylcellulose (sodium CMC) to thicken the binder and aid in maintaining uniformity of the dispersion of the binding agent components. Both such additions are well understood by those skilled in the art and form no part of our invention.

Another liquid binding agent which we may use in welding flux for covered electrodes consists of, per 100cc of water: sodium aluminate 15 grams, lithium fluoride 6 grams, sodium fluoride 3 grams, potassium fluoride 3 grams, sodium chromate 0.3 grams.

From the standpoint of as-baked moisture level and rehydration rate the best silicate bonded electrodes of which we are aware show moisture levels in the range 0.06% to 0.12% as measured in the so-called Navy water test, which consists of fusing a crushed sample of the baked electrode coating in a stream of oxygen at 1,800° F, and a rehydration rate in an 88% relative humidity atmosphere at room temperature of about 0.15% and 0.30% after 1 and 6-hour exposures respectively. It should be borne in mind that the large preponderance of silicate fluxes on the market at present are higher than this in rehydration rate. These figures were used as standards of comparison for a series of experimental covered electrodes coated with our new flux. In preparing each experiment of the series the following listed finely divided flux materials in the amounts shown were first combined in a dry mixing operation:

| | |
|---|---|
| Sodium CMC, 40 mesh × Down | 15 grams |
| Rutile concentrates, 40×200 mesh | 20 grams |
| Marble, 100 mesh | 150 grams |
| Calcium carbonate, −200 mesh | 250 grams |
| Calcium carbonate, precipitated | 100 grams |
| Fluorspar, 50×325 mesh | 450 grams |
| Ferrosilicon, 50% Silicon, stabilized, 40×325 mesh | 110 grams |
| Magnesium metal powder, 40×80 mesh | 50 grams |
| Electrolytic manganese metal, stabilized, 50×325 mesh | 30 grams |
| Nickel powder 50×325 mesh | 100 grams |
| Iron powder, 50×325 mesh | 320 grams |
| Total flux material weight | 1595 grams |

The above listed constant flux material base is typical of those used in high strength lime-fluoride low hydrogen electrode coatings.

Table 1 lists the compositions of eight different liquid binding agents, each of which was added to one formula weight (1,595 grams) of the above listed dry flux materials. Note that Experiment No. 060 utilized only sodium aluminate; this experiment was included so that a comparison could be made between flux as described in the above referred to U. S. Pat. No. 3,501,354, and our novel flux. Each binding agent was prepared by adding the listed ingredients and sodium chromate to water in the proportions indicated and mixing the combination by means of a high speed electric blender for several minutes until a uniform liquid was obtained. A sufficient amount of the uniform liquid was then added to the dry flux material mixture to produce a dough of suitable consistency which was extruded onto mild steel core wire. Table 1 lists the amount of binder liquid required to produce the proper consistency with the dry material mixture for each of the binders studied.

Samples of each of the electrodes were baked at 800° F for 2 hours; such a bake is typical of those used with silicate bonded low hydrogen fluxes. Table 2 lists the amount of each binding agent component present in each as-baked flux as a percentage of the flux material weight.

After baking, each flux sample was checked for moisture by the Navy water test and for rehydration after 1- and 6-hour exposures to an atmosphere of 88 percent relative humidity at room temperature. Table 3 lists the results of the moisture and rehydration rate checks on the fluxes studied, and for comparison lists the same data for the best silicate bonded flux of which we are aware.

TABLE 1.—LIQUID BINDING AGENT COMPOSITIONS

| Binding agent component | Experiment No. | | | | | | | |
|---|---|---|---|---|---|---|---|---|
| | 060 | 066 | 080 | 081 | 037 | 085 | 071 | 086 |
| $H_2O$ | 100cc | 100cc | 100cc | 100cc | 100cc | 100cc | 100cc | 100cc |
| Sodium chromate | .3g | .3g | .3g | .3g | .3g | .3g | .3g | .3g |
| Sodium aluminate trihydrate (40% $Al_2O_3$ 31% $Na_2O$, 23% $H_2O$) | 15g | 15g | 10g | 10g | | | | |
| Lithium fluoride | | 10g | 10g | 10g | | 10g | | |
| Lithium hydroxide monohydrate | | | | | 5g | | 15g | |
| Sodium fluoride | | | 20g | 20g | 20g | 20g | | 25g |
| Potassium fluoride | | | | | | | 30g | |
| Sodium hydroxide | | | | | 5g | 7g | | 7g |
| Potassium hydroxide | | | | 10g | 5g | 7g | 15g | 7g |

3,769,099

TABLE 1.—LIQUID BINDING AGENT COMPOSITIONS—Continued

| Binding agent component | Experiment No. | | | | | | | |
|---|---|---|---|---|---|---|---|---|
| | 060 | 066 | 080 | 081 | 037 | 085 | 071 | 086 |
| Sodium carbonate | | | | | | 8g | | 8g |
| Potassium carbonate | | | | | | 8g | | 8g |
| Potassium silicofluoride | | | | | | | | 5g |
| Wt. of liquid binding agent used per 1595g flux material | 181g | 262g | 280g | 276g | 242g | 229g | 243g | 229g |

TABLE 2.—BINDING AGENT CONTENT OF BAKED FLUX, PERCENT*

| Binding agent component | Experiment No. | | | | | | | |
|---|---|---|---|---|---|---|---|---|
| | 060 | 066 | 080 | 081 | 037 | 085 | 071 | 086 |
| Sodium aluminate | 1.1 | 1.4 | .9 | .8 | | | | |
| Lithium fluoride | | 1.2 | 1.3 | 1.2 | | .9 | | |
| Lithium oxide (from LiOH·H$_2$O) | | | | | .2 | | .5 | |
| Sodium fluoride | | | 2.5 | 2.3 | 2.2 | 1.8 | | 2.2 |
| Potassium fluoride | | | | | | | 2.9 | |
| Sodium oxide (from NaOH) | | | | | .4 | .5 | | .5 |
| Potassium oxide (from KOH) | | | | 1.0 | .5 | .5 | 1.2 | .5 |
| Sodium oxide (from Na$_2$CO$_3$) | | | | | | .4 | | .4 |
| Potassium oxide (from K$_2$CO$_3$) | | | | | | .5 | | .5 |
| Potassium silicofluoride | | | | | | | | .4 |
| Total binding agent | 1.1 | 2.6 | 4.7 | 5.3 | 3.3 | 4.6 | 4.6 | 4.5 |
| Percent of binding agent weight comprising LiF and/or Li$_2$O | 0 | 46 | 28 | 23 | 6 | 19.5 | 11 | 0 |

* $\frac{\text{Wt. binding agent component}}{\text{Flux material wt. (=1595g)}} \times 100$

TABLE 3.—MOISTURE CONTENT AND REHYDRATION RATE OF FLUXES AFTER 800°F BAKE FOR 2 HOURS

| | Experiment No. | | | | | | | | Best silicate bound flux |
|---|---|---|---|---|---|---|---|---|---|
| | 060 | 066 | 080 | 081 | 037 | 085 | 071 | 086 | |
| Percent moisture by Navy Water Test | .075 | .074 | .073 | .064 | .063 | .068 | .072 | .087 | .06–.12 |
| Percent H$_2$O picked up after 1 hr at room temp. in 88% relative humidity | .51 | .17 | .14 | .10 | .06 | .11 | .26 | .40 | .15 |
| Percent H$_2$O picked up after 6 hr room temp. in 88% relative humidity | 1.82 | .40 | .40 | .28 | .14 | .28 | .40 | .77 | .30 |

Several advantages and features of our flux and binding agent are apparent from the data set forth in the tables. First, comparing Experiment Nos. 060 and 066, it will be seen that the addition of lithium fluoride in the quantity shown reduced the rehydration rate of the flux by a factor of three after 1 hour's exposure and by a factor of approximately four after 6 hours' exposure, as compared to the rehydration rate of the flux bonded with aluminate alone. The additional use of sodium fluoride (Exp. 080) and the combination of sodium fluoride and potassium hydroxide (Exp. 081) reduced the rehydration rate of the flux somewhat further. In all three experiments embodying our novel flux and binding agent including aluminate (066, 080 and 081), the moisture level and rehydration rate of the baked flux were comparable with that of the best silicate bonded flux. The remaining four experiments were aluminate free. Experiments 037, 085 and 071 show that we are able to secure excellent moisture level and rehydration rate in such aluminate-free flux containing one of our preferred binding agent components lithium fluoride or lithium hydroxide. Experiment 086 contains no lithium compound as a binding agent component, and although the moisture level and rehydration rate of this flux are somewhat superior to that of Experiment 060 containing aluminate alone, they are not as good as the experiments containing such lithium compounds. We prefer to use lithium fluoride and/or hydroxide as binding agent components in amount equal to at least 5 percent of the total weight of the binding agent.

While the above described examples have particular reference to welding flux for application to covered electrodes and embody the use of a uniform liquid binding agent which is then added to the dry flux material, it will be appreciated that the principles are applicable to other types of fluxes and other means of adding the binding agent to the fluxes. For example, in the preparation of agglomerated submerged arc fluxes we may add the finely divided binding agent to the dry mixture of flux materials and thereafter add water to the dry mix in a blender such as the Patterson-Kelly Twin-Cone Liquid-Solids Blender above referred to. The high speed intensifier bar in the Patterson-Kelly blender prevents lithium fluoride if used from "balling up" and assures satisfactory uniformity of dispersion. Mixing is continued until the desired agglomeration has occurred, after which the flux is removed from the mixer, dried, baked and then screened through, for example, a U.S. 20 mesh screen to provide a usable agglomerated flux. In any case, it is imperative that intensive blending be carried out so that proper bond strength can be developed in the binding agent.

Recapitulating, we provide arc welding flux which may be free of silica and also may be free of alumina if desired, and which is characterized by moisture level and rehydration rate after a normal bake in the range 650° F to 950° F comparable to or better than the moisture level and rehydration rate of the best silicate-bonded fluxes of the prior art. Consequently, researchers now have freedom to study the effect of flux which is free of both silica and alumina and which, moreover, is competitive with commercial silicate bonded fluxes in the critical areas of moisture level and rehydration rate.

The liquid binding agent for bonded arc welding flux herein disclosed is claimed in our copending divisional application Ser. No. 210,144, filed Dec. 20, 1971 now U.S. Pat. No. 3,704,149.

While we have described certain present preferred embodiments of the invention it is to be distinctly understood that the invention is not limited thereto but may be otherwise variously embodied within the scope of the following claims.

We claim:

1. Arc welding flux comprising finely divided flux material and a binding agent, the binding agent consisting essentially of the following listed components present in amounts equal to the specified weight percentages of the flux material after the flux has been dried and baked:

| | |
|---|---|
| Alkali metal aluminate with a molecular ratio of alkali metal oxide to aluminum oxide between about 0.9 and 1.4 | 0.7 to 5% |
| Lithium fluoride | 0.4 to 3% |
| Sodium fluoride | 0 to 3% |
| Potassium fluoride | 0 to 3% |
| Alkali metal oxide from alkali metal hydroxide or carbonate | 0 to 3% |
| Total of above | 10% maximum |

2. Arc welding flux comprising finely divided flux material and a binding agent consisting essentially of the following listed components in amounts equal to the specified weight percentages of the flux material after the flux has been dried and baked:

| | |
|---|---|
| Lithium fluoride | 0 to 2% |
| Sodium fluoride | 0 to 4% |
| Potassium fluoride | 0 to 3% |
| Lithium oxide from lithium hydroxide | 0 to 3% |
| Sodium oxide from sodium hydroxide | 0 to 3% |
| Sodium oxide from sodium carbonate | 0 to 2% |
| Potassium oxide from potassium hydroxide | 0 to 3% |
| Potassium oxide from potassium carbonate | 0 to 2% |
| Potassium silicofluoride | 0 to 1% |
| Total of above | 1.1 to 10%. |

* * * * *

UNITED STATES PATENT OFFICE
CERTIFICATE OF CORRECTION

Patent No. 3,769,099          Dated October 30, 1973

Inventor(s) William T. DeLong, Edwin R. Szumachowski and Harold R. Heverly

It is certified that error appears in the above-identified patent and that said Letters Patent are hereby corrected as shown below:

In the caption, after the names and addresses of the inventors insert: --Assignee: Teledyne Inc., Los Angeles, California, a corporation of Delaware.--.

Signed and sealed this 2nd day of April 1974.

(SEAL)
Attest:

EDWARD M. FLETCHER, JR.          C. MARSHALL DANN
Attesting Officer          Commissioner of Patents